Sept. 11, 1934.  M. J. HANLON  1,973,623
APPARATUS FOR VENTILATING SHIPS' CARGO COMPARTMENTS
Filed Oct. 17, 1932   3 Sheets-Sheet 3
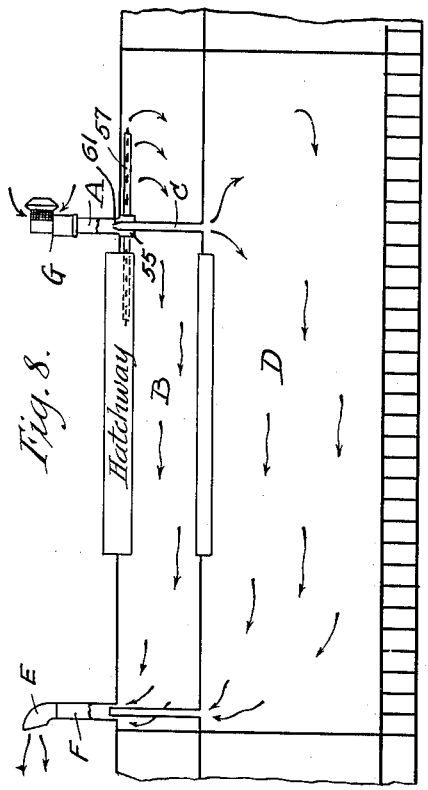
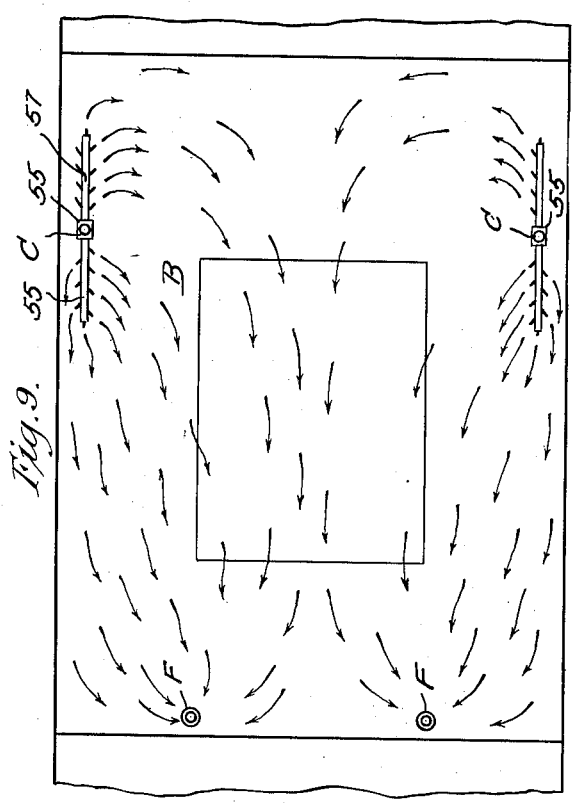
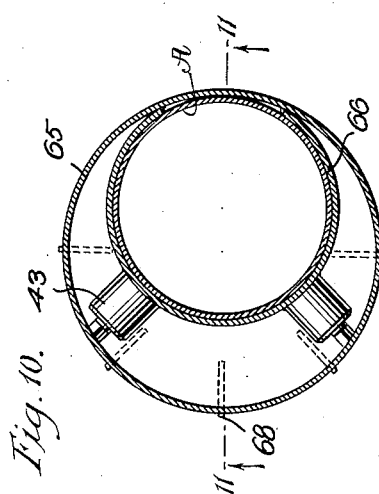
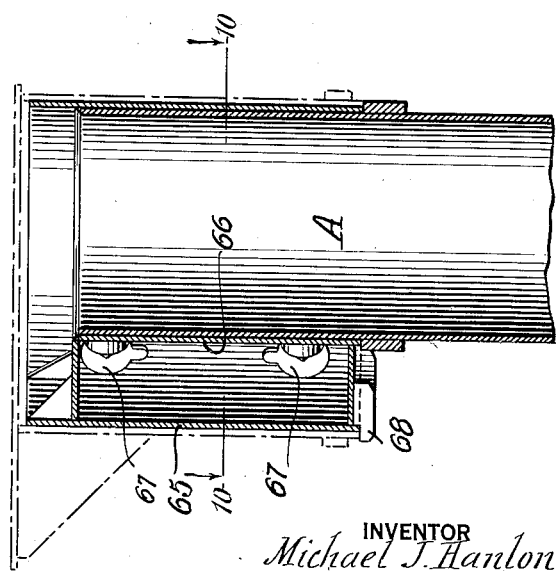
WITNESSES
INVENTOR
Michael J. Hanlon
BY
ATTORNEY Patented Sept. 11, 1934

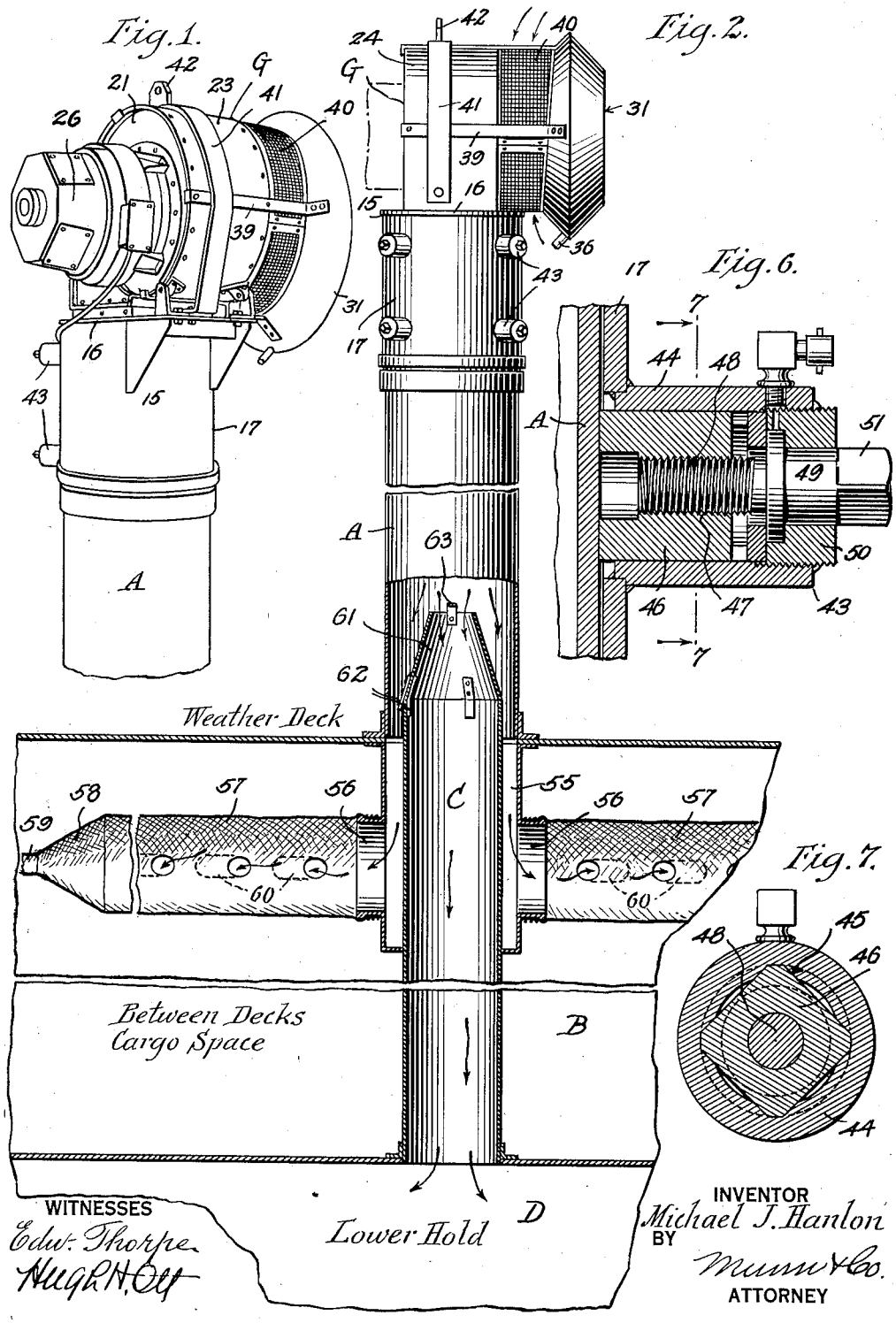

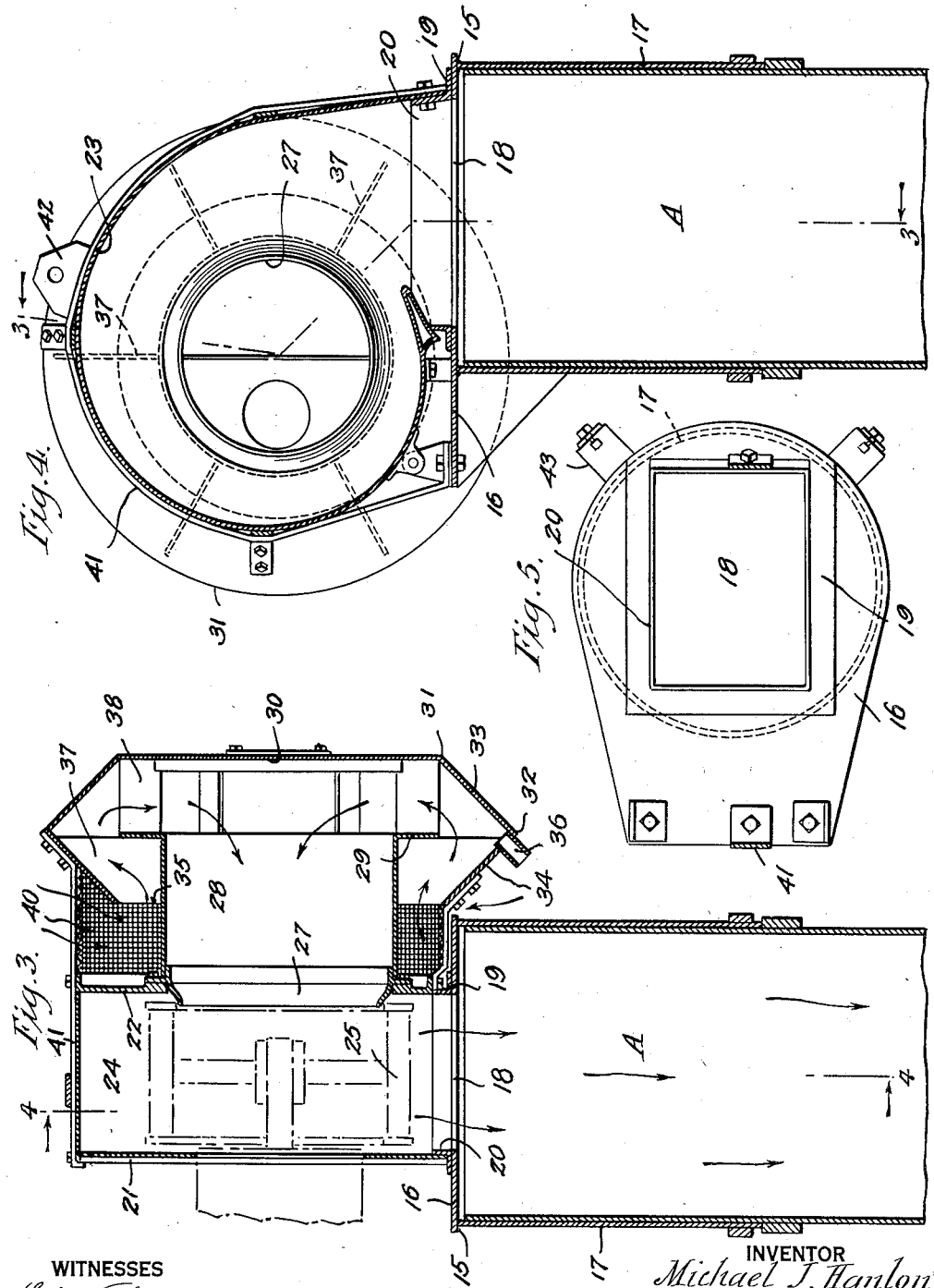

1,973,623

UNITED STATES PATENT OFFICE 1,973,623

APPARATUS FOR VENTILATING SHIPS' CARGO COMPARTMENTS

Michael J. Hanlon, Weehawken, N. J., assignor to Black Diamond Steamship Corporation, New York, N. Y., a corporation of Delaware Application October 17, 1932, Serial No. 638,230

6 Claims. (Cl. 98—64)

This invention relates to ventilating apparatus, and has particular reference to an improved means for ventilating cargo compartments of freight and passenger ships.

Broadly, the invention comprehends an improved means for continuously and positively forcing air under a pressure in excess of atmospheric pressure through the cargo compartments for insuring a complete, rapid and thorough change of air in the compartment and for maintaining a temperature balance between the outside air and the air within the compartment.

The invention also contemplates in connection with a pressure ventilating system, means for distributing the incoming air so as to insure a complete and effectual circulation throughout the entire area of the compartment.

The invention further aims to provide a forced draft ventilating attachment which is made as a unit and so constructed and arranged that it may be readily applied to an intake ventilator trunk in lieu of the usual cowl and without requiring alteration to the trunk.

The invention further embodies an attachment for an intake ventilator trunk which is constructed in such a manner as to prevent the ingress of moisture or other harmful foreign matter to the cargo compartment.

As a still further object, the invention resides in the provision of means for optical association with the upper intake end of the lower hold inlet trunk section, by virtue of which the ratio of air supply to the lower hold and the between deck cargo space may be varied.

As a further feature, the invention embraces an adapter means which serves to adapt the forced air draft ventilator unit to the inlet ventilator trunk.

Other objects of the invention reside in the comparative simplicity of construction of the ventilating apparatus, the economy with which it may be produced and installed and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a perspective view of an improved cowl unit applied to a ventilator trunk.

Figure 2 is a fragmentary vertical sectional view through a ship, illustrating the air distributing manifold of the invention in section and showing the improved cowl unit in side elevation.

Figure 3 is an enlarged fragmentary vertical sectional view through the upper portion of the ventilator trunk and through the improved cowl unit, the same being taken approximately on the line indicated at 3—3 in Figure 4.

Figure 4 is a similar view taken on a plane indicated approximately by the line 4—4 in Figure 3.

Figure 5 is a top plan view of the base of the cowl unit with the superstructure removed.

Figure 6 is an enlarged detail sectional view of one of the clamping elements for securing the cowl unit on the ventilator trunk.

Figure 7 is a cross sectional view therethrough taken approximately on the line 7—7 of Figure 6.

Figure 8 is a vertical sectional view diagrammatically illustrating the improved ventilating apparatus.

Figure 9 is a diagrammatic horizontal plan view.

Figure 10 is a horizontal sectional view of an adapter, taken approximately on the line indicated at 10—10 in Figure 11.

Figure 11 is a vertical sectional view of the adapter, taken approximately on the line 11—11 of Figure 10.

In the drawings, A designates generally an inlet ventilator trunk which communicates with the between deck cargo space B of a ship, and C designates the inlet ventilator trunk which communicates with the lower hold D of the ship, and which latter trunk C extends upwardly through the weather deck and terminates within the lower portion of the ventilator trunk A, which is of the usual construction. In place of the usual cowl E, which is shown diagrammatically at the upper end of the outlet ventilator trunk F in Figure 8, a forced air draft ventilator cowl unit is employed, which is designated generally by the reference character G, and which unit broadly consists of a motor driven blower for drawing in air from the outside and discharging the same into the trunk A under a pressure in excess of atmospheric pressure so as to effect a continuous, thorough, effective and rapid change of the air in the cargo spaces and to maintain a balanced temperature between the outside air and the air within the cargo spaces, thereby avoiding sweating or the formation of condensation on the sides and deck head of the cargo compartment. As illustrated, the cowl unit includes a base 15 comprising an upper covering wall 16 and a depending hollow cylindrical wall 17 designed to fit over the upper intake end of the ventilator trunk A. The upper wall 16 is formed with an aperture 18, which aperture is framed by a cross sectionally angular frame 19 having an upstanding flange 20. A pair of headers 21 and 22 are secured to opposite sides of the upstanding flange 20 of the frame 19 and a scroll or wall 23 extends from the other opposite sides of the flange 20 of the frame and is located between the headers 21 and 22 to define a blower or fan chamber 24, within which any suitable type of blower or fan 25 is mounted to be driven by a motor conventionally shown at 26. The header 22 is formed with an opening 27, from which there projects horizontally outward a duct or flume 28, the outer end of which is provided with an annular marginal outwardly protruding flange 29. A baffle is provided for the outer end of the duct or flume 28, and said baffle includes an outer circular wall 30 spaced from the outer flanged end of the duct or flume and disposed parallel thereto. The said outer wall 30 of the baffle is provided with a marginal double frusto-conical or substantially cross sectionally V-shaped annular flange 31, the apex 32 of which is disposed in a plane substantially coinciding with the flange 29 of the duct or flume 28. The lead 33 of the flange, which is connected with the wall 30, flares outwardly away from the wall 30 to the apex 32, and the lead 34 flares inwardly from the apex and has its marginal or free edge 35 surrounding and spaced from the body of the duct or flume 28, so as to define between the outer surface of the duct and said edge 35, an inlet whereby the intaken air is caused to travel through a tortuous path initially directed radially outward toward the apex 32, thence radially inward around the flange 29 and between the same and the wall 30 and then into the duct or flume 28 axially thereof. During its initial radial outward movement, moisture or other solid particles of matter are in effect separated from the air by centrifugal force and are thence gravitationally discharged through a discharge outlet 36 at the bottom of the apex of the baffle, thus freeing the air of this undesirable foreign matter and permitting the fan or blower 25 to force only substantially dry, clean air into the ventilator trunk A. Obviously, the baffle may be supported in any suitable manner but, as illustrated, radial webs 37 extend between and are respectively attached to the duct or flume 28 and the lead 34 of the baffle, while radially disposed outwardly projecting supporting webs 38 extend from the flange 29 to the wall 30. In addition to this, straps 39 are secured to the fan or blower casing and extend outwardly therefrom and are connected with the baffle. As a further safeguard against the entrance of sparks, cinders or other foreign matter, a screen 40 extends around the duct or flume 28 and between the fan or blower casing and the baffle 31. The fan casing is also lashed to the base by a band 41, which band is provided with an upstanding apertured ear 42, by means of which hoisting tackle may be attached for setting the cowl unit in place or removing the same from the ventilator trunk.

While due to its weight the cowl unit will undoubtedly be retained gravitationally on the upper end of the ventilator trunk A, it may be positively secured in place by suitable gripping means, designated generally by the reference character 43. As illustrated in Figures 6 and 7, this gripping means consists of a suitable number of upwardly projecting radial bosses 44 formed on the cylindrical wall 17 of the base. The bosses 44 are hollow and formed with internal longitudinally extending grooves 45 which accommodate the corners of a slidable gripping nut 46, which is held against rotation by virtue of the engagement of its corners in the grooves. The nut is axially threaded as at 47 and receives the threaded shank 48 of a rotary stud 49 which is swiveled in a plug 50 in the outer end of the boss, the stud having a manipulating head 51. Obviously, by turning the stud 49 in the proper direction, the gripping nut 46 is impinged against the trunk A to lock the cowl unit against displacement or turning movement.

The distributing means is shown and principally designed for the purpose of distributing the intaken air to the between deck cargo space although not limited to use at this point. As shown, the distributing means consists of a wind box 55 having one or more outlet bosses 56, two being shown in the present instance. The wind box is attached to the weather deck and surrounds the lower hold trunk C. Canvas or other flexible manifold tubes 57 are lashed at one end around the wind box and outlet bosses 56, and the outer ends 58 of said manifolds 57 are constricted and terminated in a flexible nozzle 59 of reduced size. Throughout their length, each manifold tube is provided with a plurality of outlet tubes 60 which may be arranged to effectively distribute the intaken air in the cargo space.

In order to provide means for varying the proportional distribution of the air to the several cargo spaces and to obtain a desired ratio, a removable frusto-conical element 61 is mounted on the upper end of the lower hold ventilator trunk C. As shown, the lower larger end of the element 61 is formed with circumferentially spaced pairs of resilient clips 62 which engage within and outside of the upper end of the trunk C. The upper reduced end of the element 61 may be provided with a bail or handle 63 for emplacing or removing the same.

Due to the variation in the sizes of the ventilator trunks, an adapter may be employed, by virtue of which a cowl unit G of one size may be usable with trunks of various sizes. The adapter consists of a tubular body 65, the diameter of which corresponds to and is adapted to receive thereover the cylindrical wall 17 of the base of the cowl unit. The body 65 has extending in the line of its axis and within the same an eccentric cylindrical tube 66 corresponding to the size of the trunk A, which it is adapted to fit. The tube 66 is provided with gripping means, such as the means 43 illustrated in Figures 6 and 7, which gripping means are housed within the confines of the body 65 and to which access is gained by means of openings 67 in the body. The lower end of the body 66 is formed with radially projecting supporting lugs 68, upon which the lower end of the cylindrical wall 17 of the cowl unit base is designed to rest.

From the foregoing, it will be observed that a ventilating apparatus or system has been devised for ships' cargo compartments which insures a balanced temperature between the outside air and inside air, thereby eliminating sweating which results in damage to perishable cargo. Due to the forced air ventilation, positive, complete and constant penetration of the cargo compartment is insured, resulting in the dilution and removal of any accumulation of foul air or gases which may be generated by the cargo. Due to the distributing means described, distribution of the air in the cargo compartments can be controlled, both as to quantity and direction of the air streams and the insurance against any dead air pockets.

What is claimed is:

1. A ventilating device for a ships' cargo compartment including in combination with an inlet ventilator trunk, a cowl unit comprising a base mounted on the upper intake end of the ventilator trunk, a blower including a casing superimposed on said base and having its outlet communicating with said trunk, a horizontal duct communicating with and leading outwardly from the inlet end of said blower casing, an outwardly directed annular flange at the outer end of the duct and a baffle located over the outer flanged end of the duct, said baffle comprising an outer vertical wall spaced from the outer end of the duct, a marginal substantially cross sectional V-shaped annular flange surrounding the outer flanged end of the duct defining an annular inlet in rear of the outer flanged end of the duct and between the outer surface of the duct and the free margin of the baffle.

2. A ventilating device for a ship's cargo compartment including in combination with an inlet ventilator trunk, a cowl unit comprising a base mounted on the upper intake end of the ventilator trunk, a blower including a casing superimposed on said base and having its outlet communicating with said trunk, a horizontal duct communicating with and leading outwardly from the inlet end of said blower casing, an outwardly directed annular flange at the outer end of the duct and a baffle located over the outer flanged end of the duct, said baffle comprising an outer vertical wall spaced from the outer end of the duct, said baffle including a marginal substantially cross sectional V-shaped annular flange surrounding the outer flanged end of the duct defining an annular inlet in rear of the outer flanged end of the duct and between the outer surface of the duct and the free margin of the baffle, said baffle having a drain outlet at its bottom portion.

3. A ventilating device for a ship's cargo compartment including, in combination with an inlet ventilator trunk, a cowl base mounted on the upper intake end of the ventilator trunk, a blower including a casing located on the base and discharging into the trunk, a horizontal intake duct communicating with the blower casing and of appreciably smaller diameter than the blower casing, an annular flange at the outer end of the duct, a baffle comprising a hood enclosing the flanged end of the intake duct, and a screen connecting the baffle and the blower casing and constituting an inlet through which air is admitted against the outside of the intake duct and then caused to pass around the flange and into the duct.

4. A ventilating device for a ship's cargo compartment including, in combination with an inlet ventilator trunk, a cowl base mounted on the upper intake end of the ventilator trunk, a blower including a casing located on the base and discharging into the trunk, a horizontal intake duct communicating with the blower casing and of appreciably smaller diameter than the blower casing, an annular flange at the outer end of the duct, a baffle comprising a hood enclosing the flanged end of the intake duct, a screen connecting the baffle and the blower casing and constituting an inlet through which air is admitted against the outside of the intake duct and then caused to pass around the flange and into the duct, and metal strips secured to the casing and to the baffle and holding the baffle properly spaced from the intake duct.

5. A ventilating device for a ship's cargo compartment including, in combination with an inlet ventilator trunk, a cowl base mounted on the upper intake end of the ventilator trunk, a blower including a casing located on the base and discharging into the trunk, a horizontal intake duct communicating with the blower casing and of appreciably smaller diameter than the blower casing, an annular flange at the outer end of the duct, a baffle comprising a hood enclosing the flanged end of the intake duct, a screen connecting the baffle and the blower casing and constituting an inlet through which air is admitted against the outside of the intake duct and then caused to pass around the flange and into the duct, said baffle having an outlet at its lowest point, and annular walls inclining toward said outlet.

6. A ventilating device for a ship's cargo compartment including, in combination with an inlet ventilator trunk, a cowl base mounted on the upper intake end of the ventilator trunk, a blower including a casing located on the base and discharging into the trunk, a horizontal intake duct communicating with the blower casing and of appreciably smaller diameter than the blower casing, an annular flange at the outer end of the duct, a baffle comprising a hood enclosing the flanged end of the intake duct, a screen connecting the baffle and the blower casing and constituting an inlet through which air is admitted against the outside of the intake duct and then caused to pass around the flange and into the duct, metal strips secured to the casing and to the baffle and holding the baffle properly spaced from the intake duct, said baffle having an outlet at its lowest point, and annular walls inclining toward said outlet.

MICHAEL J. HANLON.